United States Patent
Jiang et al.

(10) Patent No.: US 9,397,712 B2
(45) Date of Patent: Jul. 19, 2016

(54) SYSTEMS AND METHODS FOR TRANSMITTER RECEIVE BAND NOISE CALIBRATION FOR ENVELOPE TRACKING AND OTHER WIRELESS SYSTEMS

(71) Applicant: Futurewei Technologies, Inc., Plano, TX (US)

(72) Inventors: Hong Jiang, Kernersville, NC (US); Wael Al-Qaq, Oak Ridge, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/575,729

(22) Filed: Dec. 18, 2014

(65) Prior Publication Data

US 2016/0182097 A1 Jun. 23, 2016

(51) Int. Cl.
*H04B 3/46* (2015.01)
*H04B 17/00* (2015.01)
*H04Q 1/20* (2006.01)
*H04B 1/04* (2006.01)
*H04W 24/08* (2009.01)

(52) U.S. Cl.
CPC ............ *H04B 1/0475* (2013.01); *H04W 24/08* (2013.01)

(58) Field of Classification Search
CPC ............................ H04B 1/0475; H04W 24/08
USPC ........................................................ 375/227
See application file for complete search history.

(56) References Cited

U.S. PATENT DOCUMENTS

| | | | |
|---|---|---|---|
| 2007/0025433 A1* | 2/2007 | Hammerschmidt et al. | 375/224 |
| 2010/0169303 A1 | 7/2010 | Biderman et al. | |
| 2010/0312905 A1 | 12/2010 | Sandmann et al. | |
| 2011/0103287 A1 | 5/2011 | Ma et al. | |
| 2011/0119395 A1 | 5/2011 | Ha et al. | |
| 2011/0231569 A1 | 9/2011 | Luby et al. | |
| 2012/0002755 A1* | 1/2012 | Chen | H03K 7/08 375/302 |
| 2013/0290556 A1 | 10/2013 | Giladi | |
| 2014/0205027 A1* | 7/2014 | Yamada | 375/257 |
| 2014/0213204 A1* | 7/2014 | Balteanu et al. | 455/127.2 |
| 2015/0044979 A1* | 2/2015 | Seckin et al. | 455/114.2 |
| 2015/0126141 A1* | 5/2015 | Arno | 455/114.3 |

OTHER PUBLICATIONS

"Adaptive Streaming Ad Insertion Modifying Playlists to Deliver Targeted Ads Using HTTP Adaptive Streaming," RGB Network, White Paper, retrieved from the internet:<URL: http.rgbnetworks.com/pdfs/Adaptive_Birate_Ad_Insertion_White_Paper_0911-01.pdf>, 2011, pp. 1-8.

(Continued)

*Primary Examiner* — Tanmay Shah
(74) *Attorney, Agent, or Firm* — Slater Matsil, LLP (57) ABSTRACT

System and method embodiments are provided for transmitter receive band noise calibration in a wireless device. In an embodiment, a method in a wireless device for transmitter receive band noise calibration includes transmitting, by the wireless device, a signal; iteratively measuring, by the wireless device, a receive band noise caused by the transmitted signal, determining a corrected transmitter parameter for the transmitted signal, and transmitting a corrected signal using the corrected transmitter parameter until a reduced receive band noise is achieved; and setting a final transmitter parameter according to the corrected transmitter parameter corresponding to the reduced receive band noise.

16 Claims, 12 Drawing Sheets

(56) References Cited

OTHER PUBLICATIONS

"Digital Program Insertion Cueing Message for Cable," American National Standard, ANSI/SCTE 35, Society of Cable Telecommunications for Engineers, Engineering Committee, Digital Video Subcommittee, 2012, 44 pages.

Giladi, A. et al., "ISO/IEC FDIS 23009-4," International Organisation for Standardisation, Organisation Internationale de Normalisation, ISO/IEC JTC1/SC29/WG11, Coding of Moving Pictures and Audio, Genevea, Switzerland, Jan. 2013, 34 pages.

Hariharan, K. et al., "A Delta-Sigma Based Buck Converter-Design Methodology for Wireless Systems," Electrical and Power Engineering Frontier, Dec. 2013, vol. 2, Issue 4, 21 pages.

ISO/IEC 23009-1, Information Technology-Dynamic Adaptive Streaming Over HTTP (DASH)-Part 1: Media Presentation Description and Segment Formats, First Edition, Apr. 1, 2012, 134 pages.

International Search Report and Written Opinion of the International Searching Authority received in Patent Cooperation Treaty Application No. PCT/US2013/038272, mailed Sep. 27, 2013, 9 pages.

International Search Report and Written Opinion of the International Searching Authority received in Patent Cooperation Treaty Application No. PCT/US13/41716, mailed Jul. 25, 2013, 8 pages.

Mueller, C. et al., "A Test-Bed for the Dynamic Adaptive Streaming over HTTP featuring Session Mobility," Proceedings of the second annual ACM, retrieved from the internet: <URL: http://www-itec.uni-klu.as.at/bib/files/mueller_A_Test_Bed_for_DASH_featurning_Session_Mobility.pdf>, Feb. 23-25, 2011, 5 pages.

Pantos, R. et al., "HTTP Live Streaming Draft-Pantos-http-live-streaming-10," Informational Internet Draft, Apple Inc., Oct. 15, 2012, 38 pages.

\* cited by examiner

SYSTEMS AND METHODS FOR TRANSMITTER RECEIVE BAND NOISE CALIBRATION FOR ENVELOPE TRACKING AND OTHER WIRELESS SYSTEMS

TECHNICAL FIELD

The present invention relates to a wireless device, and, in particular embodiments, to a system and method for receive band noise calibration.

BACKGROUND

In cellular terminals such as mobile phones and USB modems, modulating the supply voltage of the power amplifier (PA) in such a way as to follow the envelope of the transmitted signal allows the PA to be operated at a higher efficiency, a technique known as envelope tracking (ET). The circuitry that generates the PA supply voltage is called an ET modulator. One challenge in designing a chipset that uses envelope tracking is the fact the ET modulator switching clock spurs and other noise generated from the ET system are strong and can fall into the receiver frequency band, which leads to receiver de-sense.

For a non-ET wireless terminal, distortion generated by the transmitter can also be high enough and fall into the receiver frequency band, which leads to receiver de-sense as well.

Various design techniques have been tried in the past to mitigate the RX band noise risk. However the RX band noise remains to be one of the most challenging tasks and it is one of the key factors in transmitter design for wireless terminal.

SUMMARY

In an embodiment, a method in a wireless device for transmitter receive band noise calibration includes transmitting, by the wireless device, a signal; iteratively measuring, by the wireless device, a receive band noise caused by the transmitted signal, determining a corrected transmitter parameter for the transmitted signal, and transmitting a corrected signal using the corrected transmitter parameter until a reduced receive band noise is achieved; and setting a final transmitter parameter according to the corrected transmitter parameter corresponding to the reduced receive band noise.

In an embodiment, a wireless device configured for transmitter receive band noise calibration includes a transmitter; a receiver; a processor; and a computer readable storage medium storing programming for execution by the processor, the programming including instructions to: cause the transmitter to transmit a signal; iteratively measure a receive band noise caused by the transmitted signal and received by the receiver, determine a corrected transmitter parameter for the transmitted signal, and cause the transmitter to transmit a corrected signal using the corrected transmitter parameter until a reduced receive band noise is achieved; and set a final transmitter parameter according to the corrected transmitter parameter corresponding to the reduced receive band noise.

In an embodiment, a wireless device configured for transmitter receive band noise calibration includes a transmitter configured to transmit a signal according to at least one transmitter parameter; a receiver configured to receive the signal; a receive band noise calibration component configured to measure a receive band noise caused by the transmitted signal and determine a corrected transmitter parameter for the transmitted signal; and a transmit parameter controller configured to receive the corrected transmitter parameter from the receive band noise calibration component and adjust the transmitter parameter to correspond to the corrected transmitter parameter, wherein the transmitter is configured to retransmit a corrected signal according to the corrected transmitter parameter, wherein the receive band noise calibration component is configured to measure the receive band noise caused by the corrected transmitted signal and determine a new corrected transmitter parameter iteratively, until the new corrected transmitter parameter corresponds to a specified reduced receive band noise, and wherein the receive band noise calibration component is configured to cause the transmit parameter controller to set the new corrected transmitter parameter as the transmitter parameter for future transmissions once the specified reduced receive band noise is achieved.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In a wireless terminal, the transmitter generates both the desired signal and an un-desired signal (distortion) due to the non-perfect nature of the transmitter. In the frequency domain, the un-desired signal may fall into the terminal receiver's frequency or into another wireless terminal's receiver frequency bands (normally referred to as protected bands). Normally, any distortion (un-desired signal) has to be kept low enough so that the impact to the receiver sensitivity is acceptable. However, this is a very challenging task, especially for an envelope tracking (ET) transmitter system because the spurs generated by the ET modulator are normally very strong and can easily fall into the receiver frequency band.

Disclosed herein is a calibration system and method to reduce or substantially minimize the RX band noise generated by the transmitter.

Disclosed herein are systems and methods for transmitter receive band noise calibration for envelope tracking and other wireless systems. In an embodiment, a wireless terminal's own receiver is used to measure the received (RX) band noise and searches for a substantially best transmitter setting to reduce or substantially minimize the RX band noise during a factory calibration phase. The calibration result is stored in memory. In a real normal mode operation, the correction is applied to the transmitter so that the RX band noise is reduced or substantially minimized. Because, in an embodiment, the receiver and transmitter are set to be the same operating condition during the calibration phase and real operating phase, the calibration result may be very accurate and the correction may be very effective.

Dealing with the issue of RX band noise cancellation for an envelope tracking system can be a very challenging task. Using the disclosed methods and systems to cancel the RX noise can significantly improve the RX band noise performance. For a non-ET system, the $3^{rd}$ order counter-intermodulation (CIM3) distortion can be a major factor in terms of receiver de-sensing, but embodiments of the disclosed methods and systems to cancel CIM3 accurately can significantly improve the RX band noise performance. Furthermore, the RX band noise performance can be an important factor in wireless terminal TX design. However, embodiments of the disclosed systems and methods provide the ability for designers to select a more efficient TX architecture or gain control settings with respect to current used by the device without incurring RX band noise performance degradation.

In the past, other techniques have been tried in order to minimize the impact of RX sensitivity, but each of these have drawbacks. One prior art technique designed the transmitter to have high signal integrity so that no calibration was needed. However, this approach usually has higher current consumption and longer development time as compared to embodiments of the disclosed systems and methods since, in this prior technique, a more efficient and simpler design cannot be selected due to the excessive RX noise. In another prior art technique, the receiver is calibrated and designed such that the receiver is relatively in-sensitive to the RX noise distortion. However, with this prior technique, some things, like envelope tracking system clock spur, are either impossible or are very difficult to correct because this prior art technique does not address the root of the problem, i.e., that the transmitter does not have high enough signal integrity. These techniques, instead of addressing the transmitter issues, only correct on the receiving side.

Embodiments of the disclosed systems and methods can tolerate more spurs generated by the transmitter (either with or without an envelope tracking system) as compared to prior systems. Furthermore, as discussed above, more efficient transmitter architectures (with respect to current usage) can be used than is possible with prior art systems. This improves the overall system efficiency and increase phone talk time. Furthermore, embodiments of the disclosed systems and methods allow for the reduction of the requirements placed on the transmitter in terms of receiver band noise, thereby allowing for a reduced chip die size and a reduced manufacturing cost as compared to current techniques.

For a wireless terminal, the noise generated by the transmitter can fall into the receive band of the wireless terminal itself or other wireless terminal's receive bands (normally referred as protected bands). If the RX band noise is high enough, the wireless terminal will suffer receiver de-sensitization (de-sense), which leads to call drops or a through-put drop for a phone application.

The risk of de-sensing the receiver is especially high for an ET system because ET systems normally use pulse width modulation (PWM) signals, which are basically square wave signals, and clock spurs or clock harmonics can fall into the receiver frequency band. For example, if the ET modulator uses 80 MHz switching frequency clock to generate the PWM signal and modulates the power amplifier (PA) supply, the unwanted 80 MHz clock spur will show up at 80 MHz offset from the transmitting frequency at the PA output. If the wireless terminal is operating under Third Generation Partnership Project (3GPP) band 2 operation, the RX channel is 80 MHz away from the TX signal. This means that the clock spur from the ET modulator will fall into the receive band and can de-sense the receiver when the level is high enough.

Another example of a protected band receiver de-sense is a 3GPP long term evolution (LTE) single resource block (RB) operation. If the transmitting frequency at the baseband is −fbb and the local oscillator (LO) frequency is flo, there may be an unwanted distortion at flo+3*fbb at the PA output. For LTE band 26 operation, the fbb can be as high as 6.75 MHz, which means that the unwanted signal can be LO+6.75 MHz*3. Because the guard band between RX and TX frequency is typically only 10 MHz, this unwanted LO+fbb*3 signal can fall into that protected band and may cause another wireless terminal operating nearby under Band 26 to have degraded RX sensitivity.

Disclosed herein is an embodiment method in a wireless device for transmitter receive band noise calibration includes transmitting, by the wireless device, a signal; iteratively measuring, by the wireless device, a receive band noise caused by the transmitted signal, determining a corrected transmitter parameter for the transmitted signal, and transmitting a corrected signal using the corrected transmitter parameter until a reduced receive band noise is achieved; and setting a final transmitter parameter according to the corrected transmitter parameter corresponding to the reduced receive band noise. In an embodiment, the reduced receive band noise is a substantially minimum receive band noise. In an embodiment, the corrected transmitter parameter includes at least one of an envelope correction, an IQ correction, a two phase delay adjustment, and a CIM3 adjustment. In an embodiment, the corrected transmitter parameter includes a tunable capacitor value for an inductive capacitive circuit between an envelope tracking modulator and a power amplifier in a transmitter in the wireless device.

Disclosed herein is an embodiment wireless device configured for transmitter receive band noise calibration includes a transmitter configured to transmit a signal according to at least one transmitter parameter; a receiver configured to receive the signal; a receive band noise calibration component configured to measure a receive band noise caused by the transmitted signal and determine a corrected transmitter parameter for the transmitted signal; and a transmit parameter controller configured to receive the corrected transmitter parameter from the receive band noise calibration component and adjust the transmitter parameter to correspond to the corrected transmitter parameter, wherein the transmitter is configured to retransmit a corrected signal according to the corrected transmitter parameter, wherein the receive band noise calibration component is configured to measure the receive band noise caused by the corrected transmitted signal and determine a new corrected transmitter parameter iteratively, until the new corrected transmitter parameter corresponds to a specified reduced receive band noise, and wherein the receive band noise calibration component is configured to cause the transmit parameter controller to set the new corrected transmitter parameter as the transmitter parameter for future transmissions once the specified reduced receive band noise is achieved. In an embodiment, the specified reduced receive band noise is a substantially minimum receive band noise, a reduction of the receive band noise below a specified threshold, or a reduction of the receive band noise by a specified percentage of an original receive band noise. In an embodiment, the transmit parameter controller is at least one of an IQ adjustment component, an envelope adjustment component wherein the envelope adjustment component is coupled to an envelope generation component, a two phase delay adjustment component, and wherein the two phase delay adjustment component is coupled to a dual phase pulse width modulation (PWM) generation component, an CIM3 adjustment component wherein the CIM3 adjustment component is coupled to a transmit signal generation component, and an inductive capacitive circuit between an envelope tracking modulator and a power amplifier in a transmitter in the wireless device, wherein the inductive capacitive circuit comprises a tunable capacitor.

Figure 1:
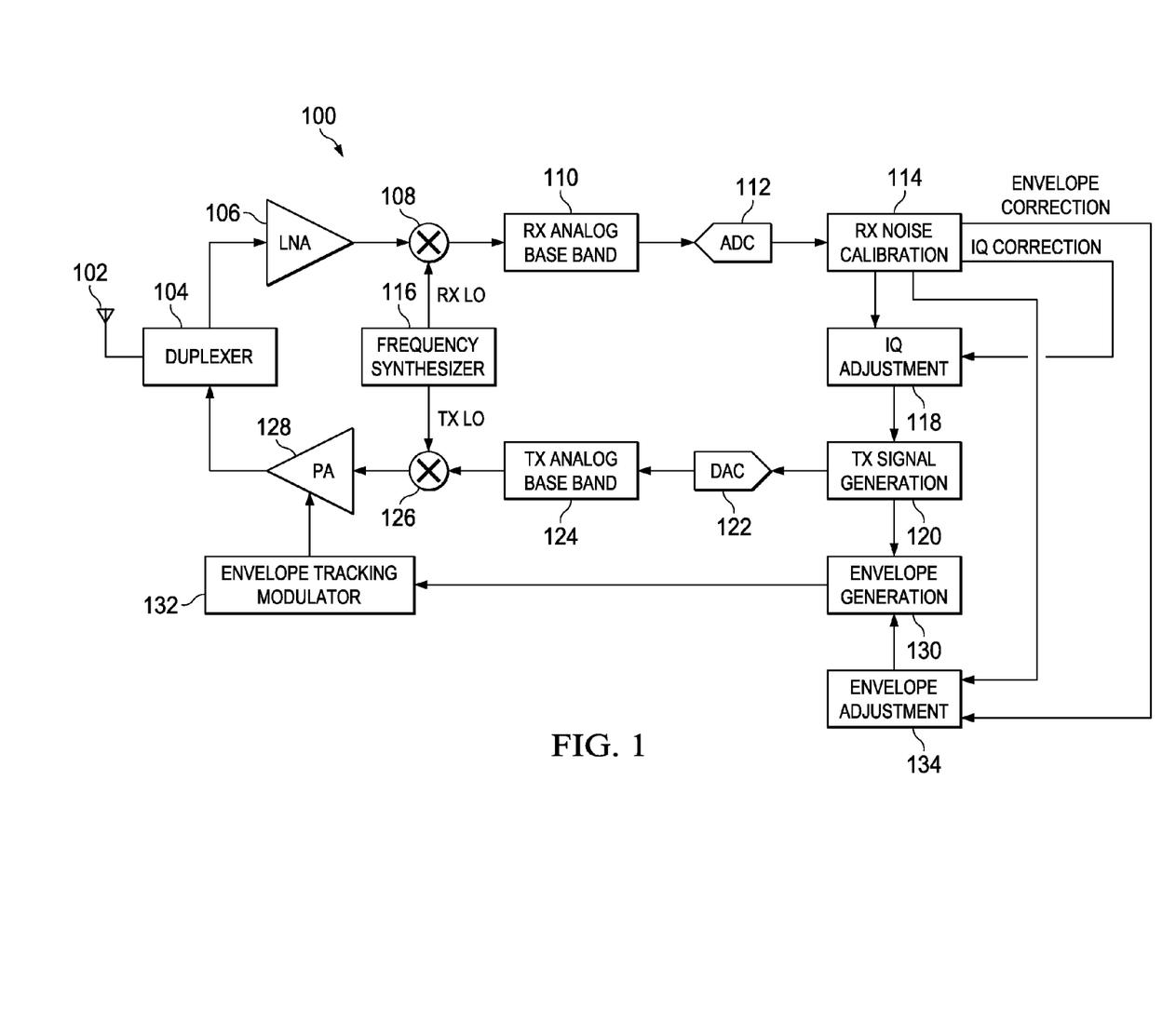
FIG. 1 is a block diagram of an embodiment system to wireless terminal calibration to reduce RX band noise generated by the transmitter.

FIG. 1 is a block diagram of an embodiment system 100 for wireless terminal calibration to reduce RX band noise generated by the transmitter. System 100 includes an antenna component 102, a duplexer 104, a low noise amplifier (LNA) 106, a RX local oscillator (LO) combiner 108, an RX analog base band 110, and analog-to-digital converter (ADC) 112, an RX noise calibration block 114, a frequency synthesizer 116, an IQ adjustment 118, a TX signal generation component 120, a digital-to-analog converter (DAC) 122, a TX analog base band 124, a TX LO combiner 126, a power amplifier (PA) 128, an envelope generation component 130, an envelope tracking modulator 132, and an envelope adjustment component 134. In an embodiment, antenna component 102 includes multiple antennas. In an embodiment, antenna component 102 includes multiple radiating elements. The components of system 100 may be arranged and connected substantially as shown in FIG. 1.

During the factory calibration phase, the RX Noise Calibration block 114 controls the envelope adjustment block 134 and IQ adjustment block 118 to apply different corrections to the transmitter system while simultaneously measuring the RX band noise. This enables the RX noise calibration block 114 to search through the possible envelope adjustments and IQ adjustments to arrive at the optimal setting in order to achieve reduced or substantially lowest RX band noise.

In this calibration setup, the receiver and transmitter are operating in the same condition as in a real operation and the TX signal can be setup as the modulated signal (Wideband Code Division Multiple Access (WCDMA), Long Term Evolution (LTE), etc.), which leads to a very accurate calibration result.

In an embodiment, if the receiver to be protected is the wireless terminal's own receiver the TX LO is set to be the desired TX LO value and the RX LO to be the desired RX LO value. The down-conversion and low pass filtering of the receiver will automatically convert the RX band noise to be around DC. In an embodiment, if the receiver is calibrated to remove the DC and IP2 impairment before the calibration, the root mean square (RMS) level of the RX signal can be substantially minimized, which leads to a reduced or substantially minimal RX band noise.

In an embodiment, if the receiver to be protected is another wireless terminal's receiver, the TX LO is set to the desired TX LO and the RX LO is set to the target RX LO of the other wireless terminal. Then the down-conversion process and the lower pass filtering will eliminate all other frequency content and the remaining signal is the targeted RX band noise. Similar to the example above, by removing DC and IP2 impairments and substantially minimizing the RMS RX signal level, the result is a substantially optimal RX band noise setting.

Figure 2:
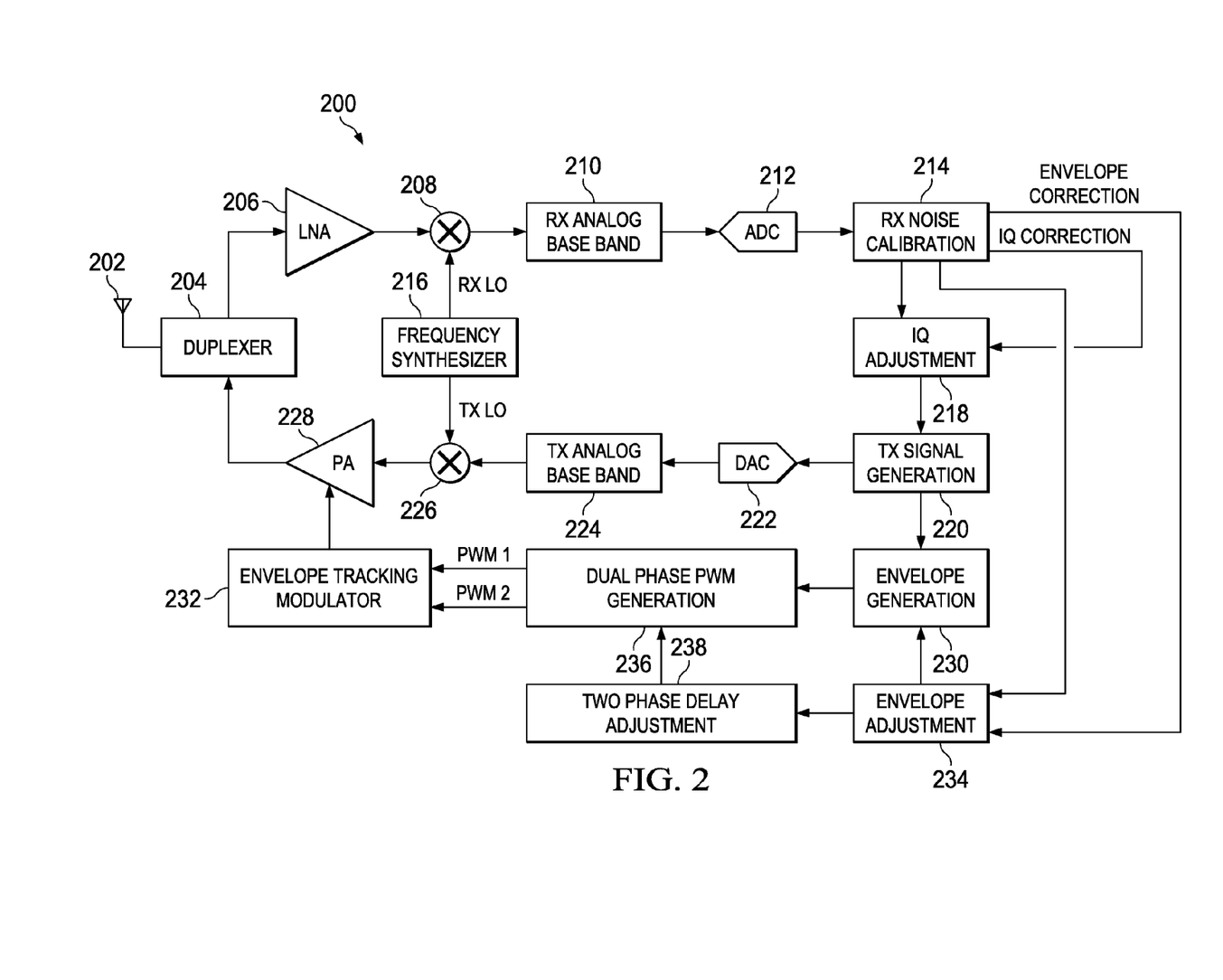
FIG. 2 is a block diagram of an embodiment dual phase open loop digital ET system for delay calibration for RX band noise.

FIG. 2 is a block diagram of an embodiment dual phase open loop digital ET system 200 for delay calibration for RX band noise. The system 200 includes an antenna component 202, a duplexer 204, an LNA 206, an RX LO combiner 208, an RX analog base band block 210, an ADC 212, an RX Noise Calibration block 214, a frequency synthesizer 216, an IQ adjustment block 218, a TX signal generation block 220, a DAC 222, a TX analog base band block 224, a TX LO combiner 226, a PA 228, an envelope generation block 230, a dual phase PWM generation block 236, an envelope tracking modulator 232, an envelope adjustment block 234, and a two phase delay adjustment 238. The components of system 200 may be arranged and connected substantially as shown in FIG. 2. System 200 is similar to system 100 except for the inclusion of the dual phase PWM generation component 236 and the two phase delay adjustment 238.

For the dual phase open loop Digital ET System 200, the PWM1 and PWM2 are shifted by half of the clock duty cycle in order to remove odd order clock harmonics. If everything is ideal, after PWM1 and PWM2 are combined at PA 228 Vcc, the fundamental of the clock will completely disappear. However due to the non-perfection of the ET modulator 232, the fundamental of the clock may still exist and can be a problem if the receiver frequency is nearby. For example if the PWM signal has clock of 60 MHz and the receiver is LTE band 18 (48 MHz+/−6.75 MHz), the skirt of the fundamental clock at the PA output will fall into the receiver band. By intentionally introducing additional delay between PWM1 and PWM2, we can cancel the fundamental clock spur can be canceled and substantially optimal RX band noise performance can be achieved.

Figure 3:
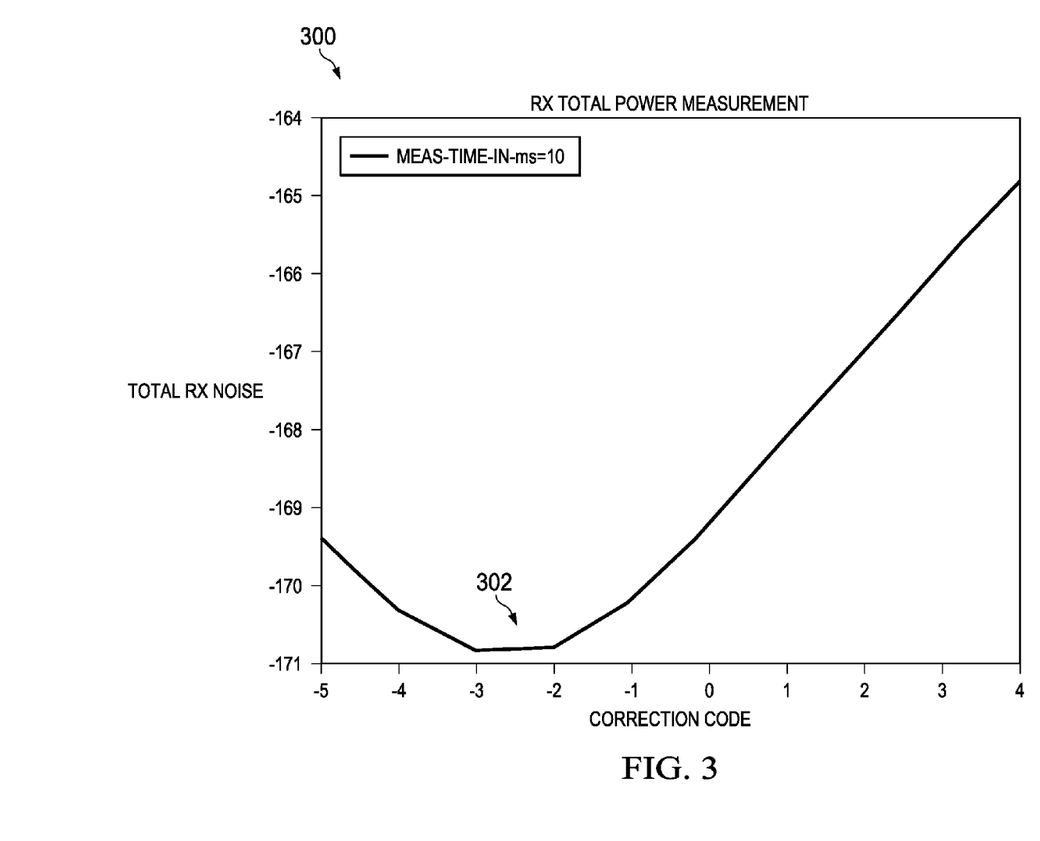
FIG. 3 shows a plot of the result of RX band noise while adjusting the two phase delay.

FIG. 3 shows a plot 300 of the result of RX band noise while adjusting the two phase delay. In an embodiment, by selecting the delay value that produces the valley 302 in the plot 300, substantially optimal RX band noise performance can be achieved.

Figure 4:
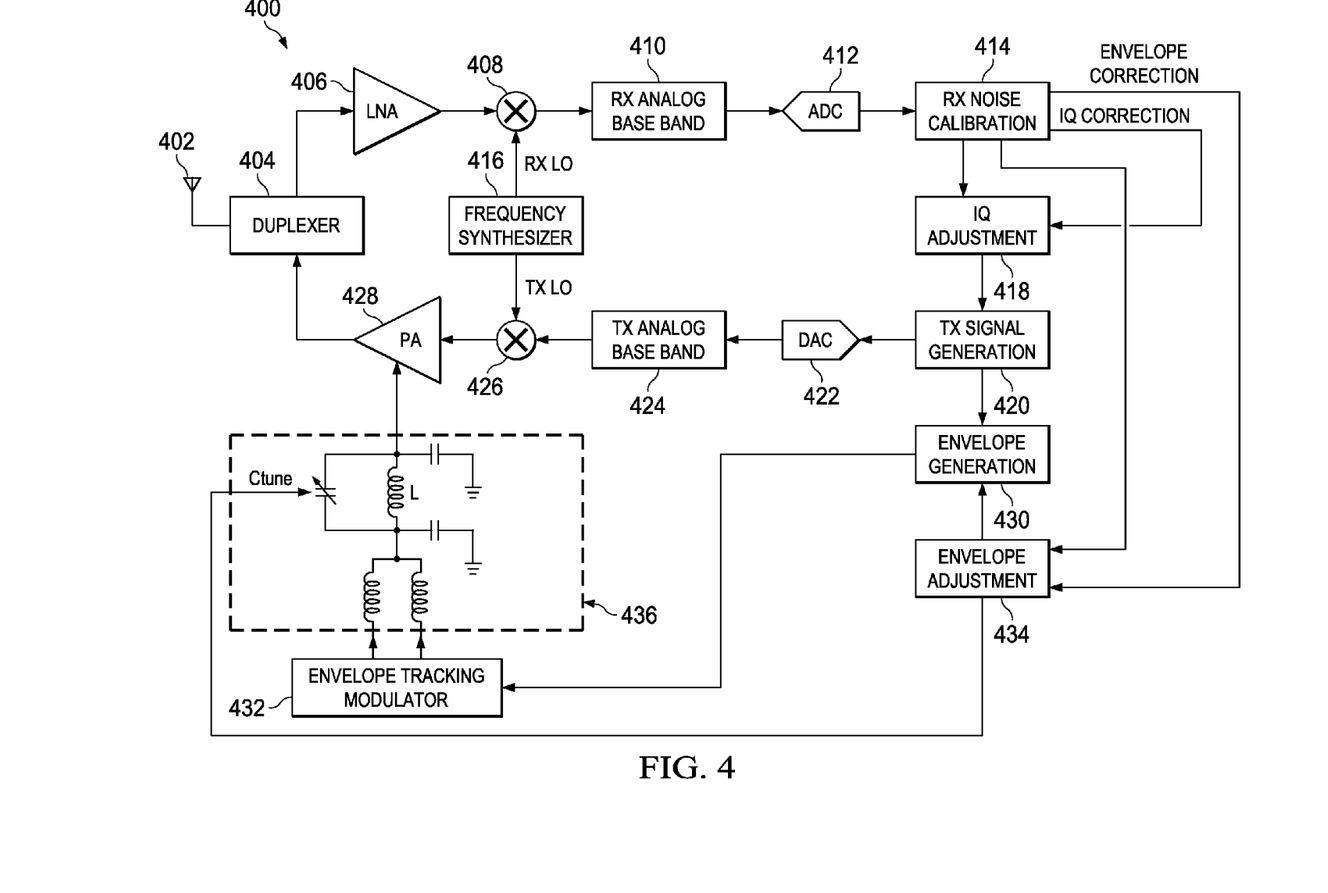
FIG. 4 is a block diagram of a second embodiment of a Dual Phase Open Loop Digital ET system filter calibration for RX band noise.

FIG. 4 is a block diagram of an embodiment of a Dual Phase Open Loop Digital ET System 400 filter calibration for RX band noise. The system 400 includes an antenna component 402, a duplexer 404, an LNA 406, an RX LO combiner 408, an RX analog base band block 410, an ADC 412, an RX Noise Calibration block 414, a frequency synthesizer 416, an IQ adjustment block 418, a TX signal generation block 420, a DAC 422, a TX analog base band block 424, a TX LO combiner 426, a PA 428, an envelope generation block 430, an envelope tracking modulator 432, an envelope adjustment block 434, and an LC network 436. The components of system 400 may be arranged and connected substantially as shown in FIG. 4. System 400 is similar to system 100 except for the inclusion of the LC network 436.

For the ET system 400, the LC network 436 at the output of the ET modulator 432 suppresses noises, including RX band noise. In this example, a notch filter (inductor (L) and tunable capacitor (Ctune)) is implemented as the LC network 436 as shown in FIG. 4. Due to manufacturing variation, the notch frequency location may vary and causing non-optimal RX band noise performance. By using the method proposed in this disclosure, Ctune can be calibrated to give the best notch of frequency for noise location.

Figure 5:
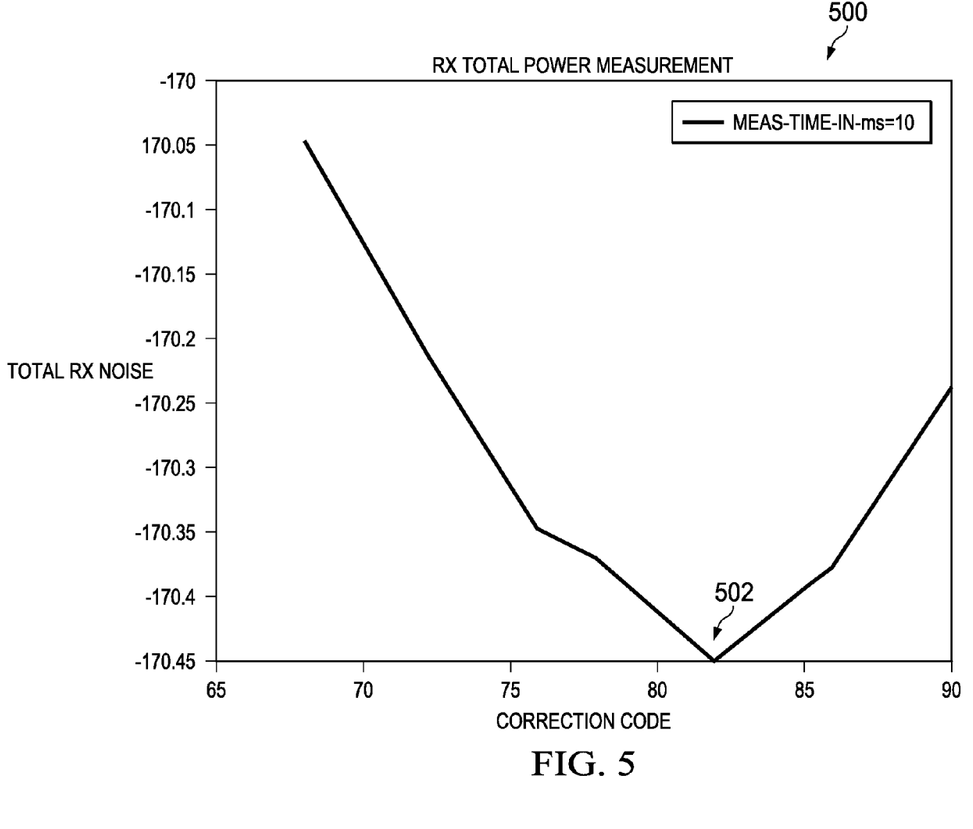
FIG. 5 shows a plot of the result of RX band noise while adjusting the Ctune value.

FIG. 5 shows a plot 500 of the result of RX band noise while adjusting the Ctune value. In an embodiment, by selecting the Ctune value that producing the valley 502 in the plot 500, substantially optimal RX band noise performance can be achieved.

Figure 6:
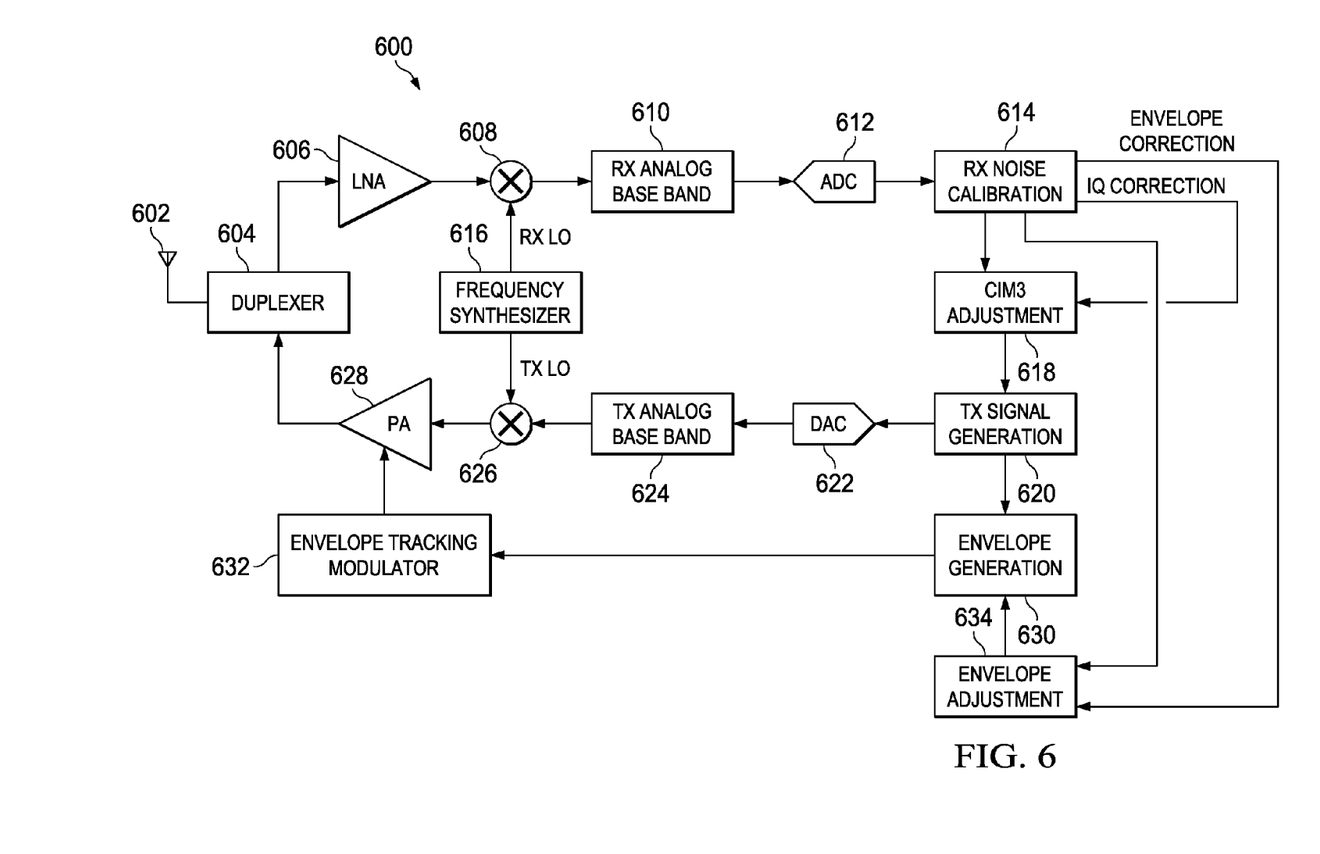
FIG. 6 is a block diagram of an embodiment of a transceiver CIM3 calibration system for RX band noise reduction.

FIG. 6 is a block diagram of an embodiment of a transceiver CIM3 calibration system 600 for RX band noise reduction. System 600 includes an antenna component 602, a duplexer 604, a LNA 606, a RX local oscillator (LO) combiner 608, an RX analog base band 610, and ADC 612, an RX noise calibration block 614, a frequency synthesizer 616, an CIM3 adjustment component 618, a TX signal generation component 620, a DAC 622, a TX analog base band 624, a TX LO combiner 626, a PA 628, an envelope generation component 630, an envelope tracking modulator 632, and an envelope adjustment component 634. In an embodiment, antenna component 602 includes multiple antennas. In an embodiment, antenna component 602 includes multiple radiating elements. The components of system 600 may be arranged and connected substantially as shown in FIG. 1. System 600 is similar to system 100 except for the replacement of IQ adjustment 118 with CIM3 adjustment 618.

In an LTE system, the single resource block (RB) test case can be a challenge in order not to de-sense the receiver.

If the TX transmits a single RB signal with a frequency at the base band frequency to be –fbb and the LO frequency is flo, a harmonic distortion (e.g., CIM3) at the PA 628 output can show up at flo-3*fbb. This flo+3*fbb signal can fall into the receive band (for example LTE band 26 operation) and cause receiver de-sense. One way to remove the CIM3 distortion is to inject a 3*fbb signal with the same amplitude and opposite phase as compared to the distortion signal. Finding the substantially optimal cancellation signal amplitude and phase can be a challenge. Using an embodiment method from this disclosure, the substantially optimal phase and amplitude of the injection 3*fbb signal can be determined, thus achieving a substantially optimal RX band noise performance.

Figure 7:
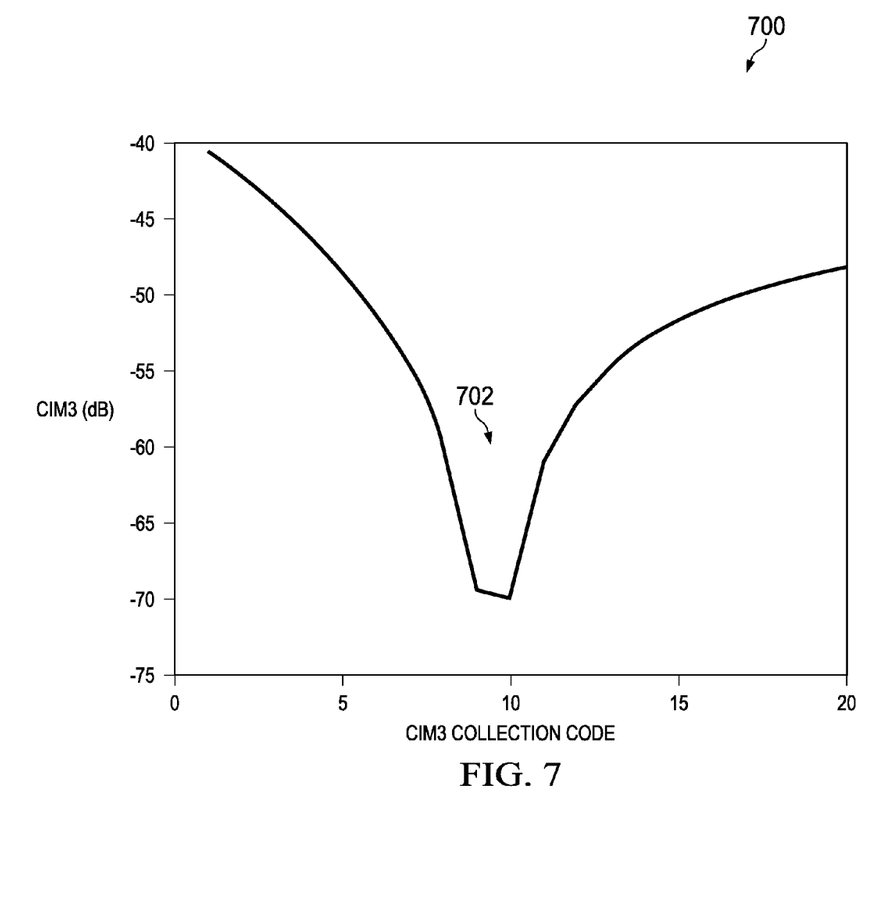
FIG. 7 shows a plot of the result of RX band noise while adjusting the CIM3 amplitude and phase value.

FIG. 7 shows a plot 700 of the result of RX band noise while adjusting the CIM3 amplitude and phase value. By selecting the amplitude and phase value that produces the valley 702 in the plot 700, optimal RX band noise performance can be achieved.

Figure 8:
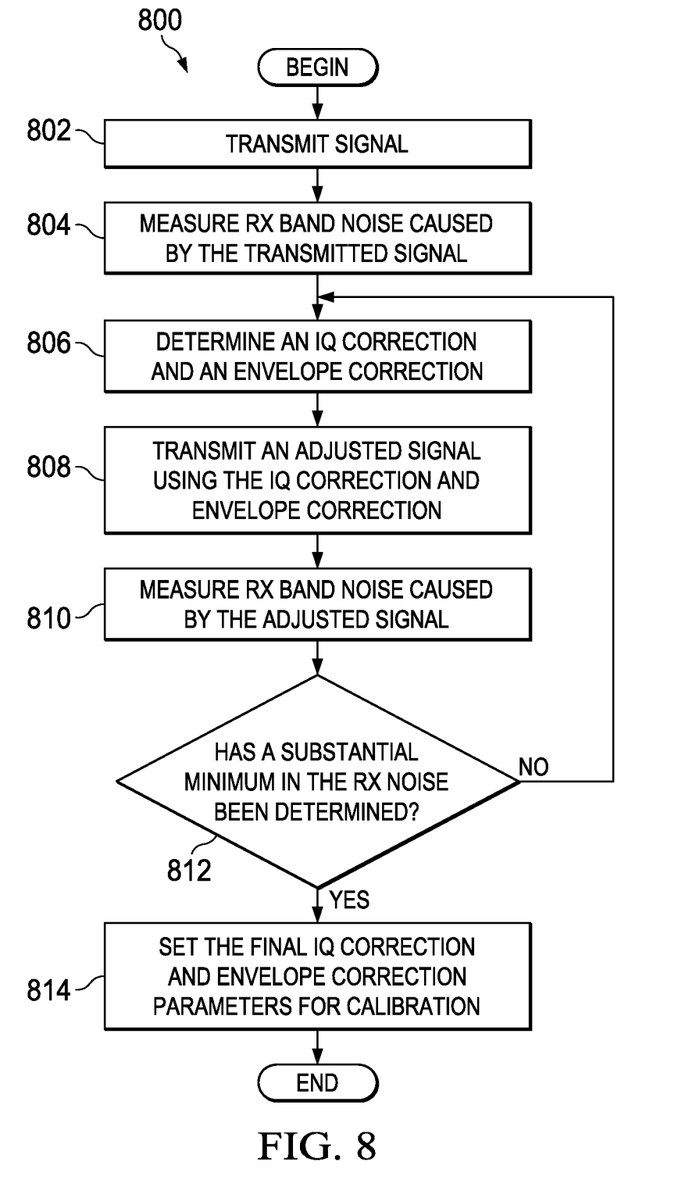
FIGS. 8-11 are flowcharts of embodiments of methods for calibrating a wireless device to reduce receiver noise caused by the device's transmitter.

FIG. 8 is a flowchart of an embodiment of a method 800 for calibrating a wireless device to reduce receiver noise caused by the device's transmitter. In an embodiment, the method 800 is implemented in system 100. The method 800 begins at block 802 where the device transmits a signal. At block 804, the device measures the RX band noise caused by the transmitted signal. At block 806, the device determines an IQ correction and an envelope correction for the transmitted signal to reduce the RX band noise caused by the transmitted signal. At block 808, the device transmits an adjusted signal using the IQ correction and envelope correction. At block 810, the device measures the RX band noise caused by the adjusted signal and, at block 812, the device determines whether a substantial minimum in the RX noise has been obtained. The device may determine whether a substantial minimum in the RX has been obtained by iteratively adjusting the transmit signal and iteratively measuring the RX band noise and comparing the RX band noise measurements against each other to determine a substantial minimum RX band noise value. If, at block 812, a substantial minimum RX band noise value has not been obtained, the method 800 proceeds to block 806. If, at block 812, a substantial minimum RX band noise value has been obtained, the method 800 proceeds to block 814. At block 814, the device sets the final IQ correction and envelope correction parameters for the device corresponding to the values for which the substantial minimum RX band noise was obtained, thereby calibrating the device for use so that RX band noise caused by the devices own transmitter will be substantially minimized. After block 814, the method 800 ends. In an embodiment, the instructions specifying the actions of method 800 are stored in a non-transitory computer readable storage media that, when executed by a processor, cause a device to perform the actions specified in method 800.

Figure 9:
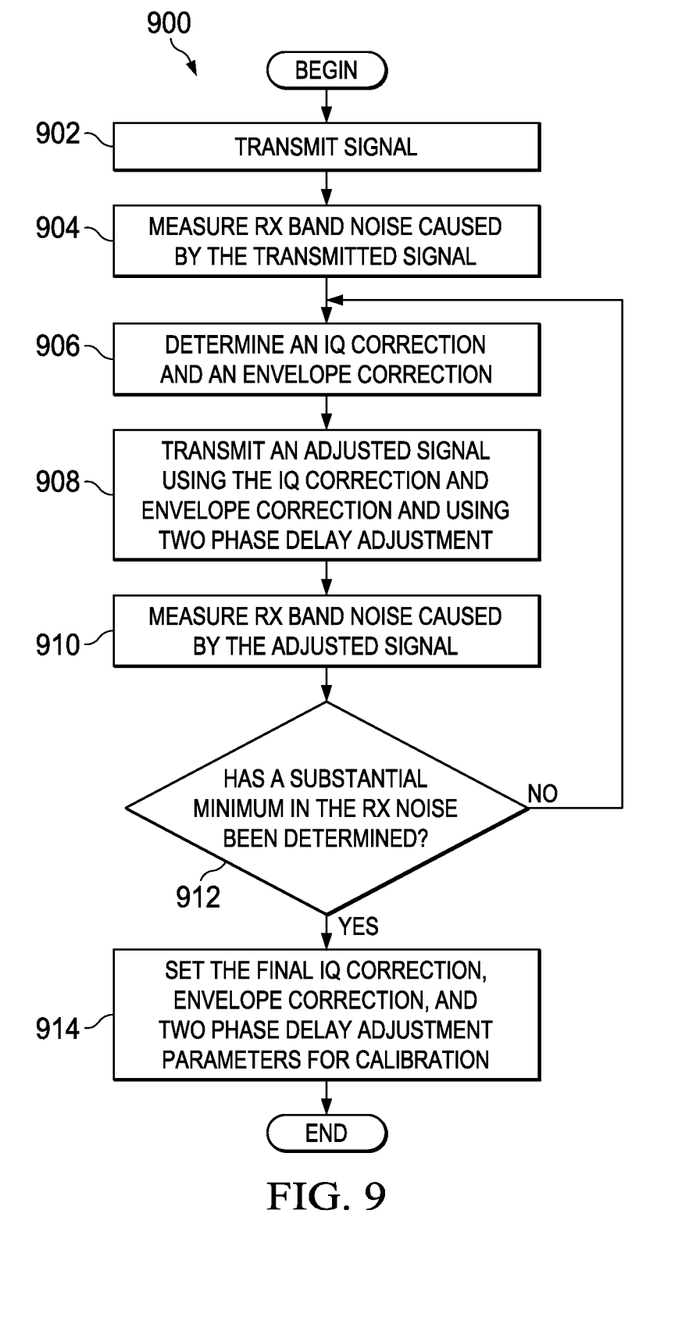

FIG. 9 is a flowchart of an embodiment of a method 900 for calibrating a wireless device to reduce receiver noise caused by the device's transmitter. In an embodiment, the method 900 is implemented in system 200. The method 900 begins at block 902 where the device transmits a signal. At block 904, the device measures the RX band noise caused by the transmitted signal. At block 906, the device determines an IQ correction and an envelope correction for the transmitted signal to reduce the RX band noise caused by the transmitted signal. At block 908, the device transmits an adjusted signal using the IQ correction and envelope correction and using a two phase delay adjustment. At block 910, the device measures the RX band noise caused by the adjusted signal and, at block 912, the device determines whether a substantial minimum in the RX noise has been obtained. The device may determine whether a substantial minimum in the RX has been obtained by iteratively adjusting the transmit signal and iteratively measuring the RX band noise and comparing the RX band noise measurements against each other to determine a substantial minimum RX value. If, at block 912, a substantial minimum RX band noise value has not been obtained, the method 900 proceeds to block 906. If, at block 912, a substantial minimum RX band noise value has been obtained, the method 900 proceeds to block 914. At block 914, the device sets the final IQ correction parameters, envelope correction parameters, and the two phase delay adjustment parameters for the device corresponding to the values for which the substantial minimum RX band noise was obtained, thereby calibrating the device for use so that RX band noise caused by the devices own transmitter will be substantially minimized. After block 914, the method 900 ends. In an embodiment, the instructions specifying the actions of method 900 are stored in a non-transitory computer readable storage media that, when executed by a processor, cause a device to perform the actions specified in method 900.

Figure 10:
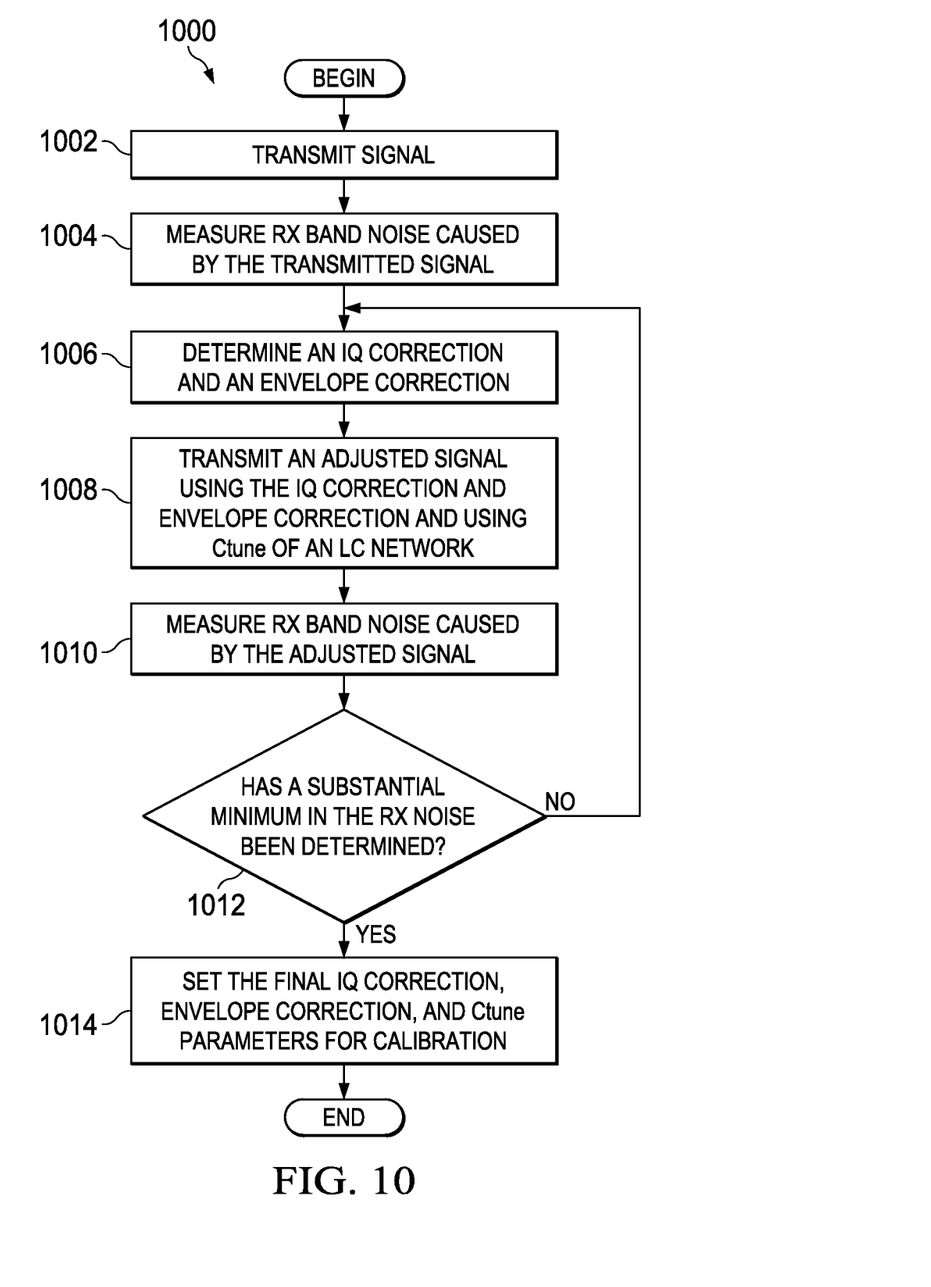

FIG. 10 is a flowchart of an embodiment of a method 1000 for calibrating a wireless device to reduce receiver noise caused by the device's transmitter. In an embodiment, the method 1000 is implemented in system 400. The method 1000 begins at block 1002 where the device transmits a signal. At block 1004, the device measures the RX band noise caused by the transmitted signal. At block 1006, the device determines an IQ correction and an envelope correction for the transmitted signal to reduce the RX band noise caused by the transmitted signal. At block 1008, the device transmits an adjusted signal using the IQ correction and envelope correction and using an adjusted Ctune value for an adjustable capacitor in an LC network. At block 1010, the device measures the RX band noise caused by the adjusted signal and, at block 1012, the device determines whether a substantial minimum in the RX noise has been obtained. The device may determine whether a substantial minimum in the RX has been obtained by iteratively adjusting the transmit signal and iteratively measuring the RX band noise and comparing the RX band noise measurements against each other to determine a substantial minimum RX value. If, at block 1012, a substantial minimum RX band noise value has not been obtained, the method 1000 proceeds to block 1006. If, at block 1012, a substantial minimum RX band noise value has been obtained, the method 1000 proceeds to block 1014. At block 1014, the device sets the final IQ correction parameters, envelope correction parameters, and the Ctune adjustment parameters for the device corresponding to the values for which the substantial minimum RX band noise was obtained, thereby calibrating the device for use so that RX band noise caused by the devices own transmitter will be substantially minimized. After block 1014, the method 1000 ends. In an embodiment, the instructions specifying the actions of method 1000 are stored in a non-transitory computer readable storage media that, when executed by a processor, cause a device to perform the actions specified in method 1000.

Figure 11:
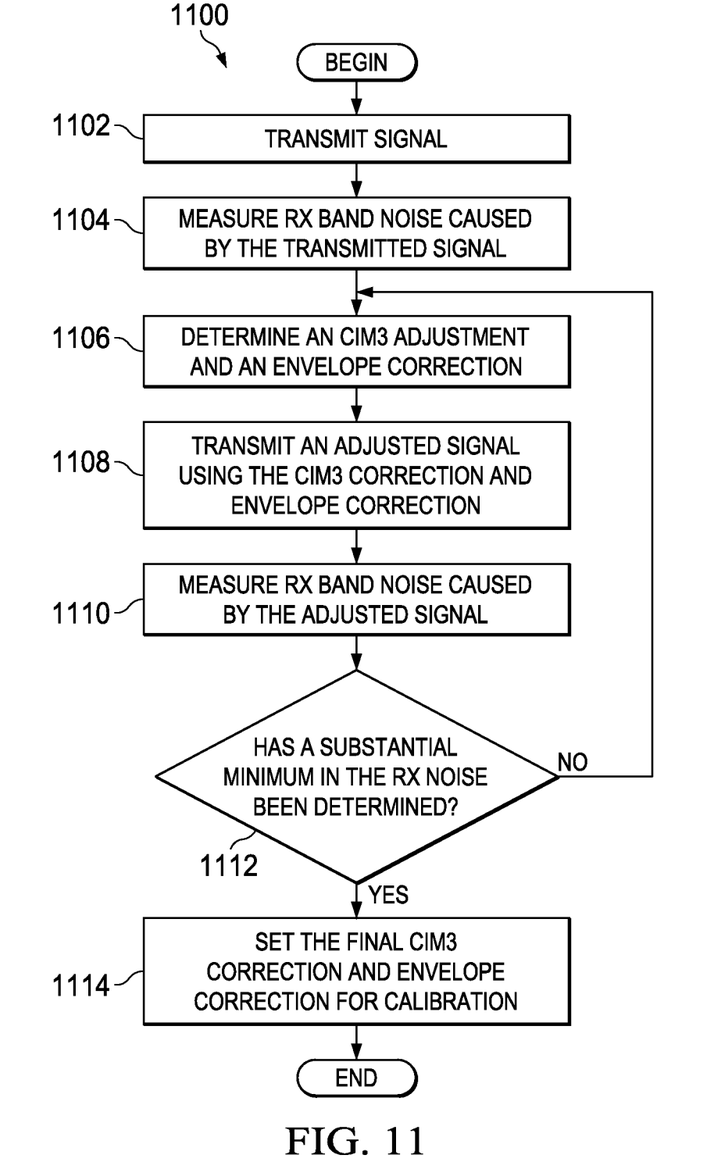

FIG. 11 is a flowchart of an embodiment of a method 1100 for calibrating a wireless device to reduce receiver noise caused by the device's transmitter. In an embodiment, the method 1100 is implemented in system 600. The method 1100 begins at block 1102 where the device transmits a signal. At block 1104, the device measures the RX band noise caused by the transmitted signal. At block 1106, the device determines an IQ correction and an envelope correction for the transmitted signal to reduce the RX band noise caused by the transmitted signal. At block 1108, the device transmits an adjusted signal using a CIM3 adjustment and an envelope correction. In an embodiment, the CIM3 adjustment is determined according to the IQ correction. At block 1110, the device measures the RX band noise caused by the adjusted signal and, at block 1112, the device determines whether a substantial minimum in the RX noise has been obtained. The device may determine whether a substantial minimum in the RX has been obtained by iteratively adjusting the transmit signal and iteratively measuring the RX band noise and comparing the RX band noise measurements against each other to determine a substantial minimum RX value. If, at block 1112, a substantial minimum RX band noise value has not been obtained, the method 1100 proceeds to block 1106. If, at block 1112, a substantial minimum RX band noise value has been obtained, the method 1100 proceeds to block 1114. At block 1114, the device sets the final CIM3 adjustment and the envelope correction parameters for the device corresponding to the values for which the substantial minimum RX band noise was obtained, thereby calibrating the device for use so that RX band noise caused by the devices own transmitter will be substantially minimized. After block 1114, the method 1100 ends. In an embodiment, the instructions specifying the actions of method 1100 are stored in a non-transitory computer readable storage media that, when executed by a processor, cause a device to perform the actions specified in method 1100.

Figure 12:
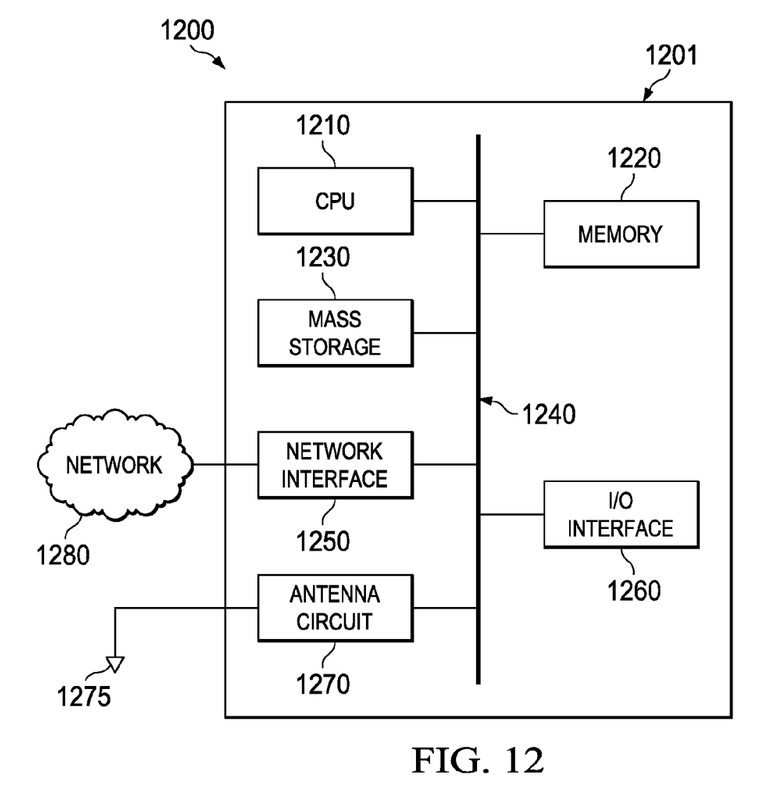
FIG. 12 is a block diagram of a processing system that may be used for implementing the devices and methods disclosed herein.

FIG. 12 is a block diagram of a processing system 1200 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1200 may comprise a processing unit 1201 equipped with one or more input/output devices, such as a speaker, microphone, mouse, touchscreen, keypad, keyboard, printer, display, and the like. The processing unit 1201 may include a central processing unit (CPU) 1210, memory 1220, a mass storage device 1230, a network interface 1250, an I/O interface 1260, and an antenna circuit 1270 connected to a bus 1240. The processing unit 1201 also includes an antenna element 1275 connected to the antenna circuit.

The bus 1240 may be one or more of any type of several bus architectures including a memory bus or memory controller, a peripheral bus, video bus, or the like. The CPU 1210 may comprise any type of electronic data processor. The memory 1220 may comprise any type of system memory such as static random access memory (SRAM), dynamic random access memory (DRAM), synchronous DRAM (SDRAM), read-only memory (ROM), a combination thereof, or the like. In an embodiment, the memory 1220 may include ROM for use at boot-up, and DRAM for program and data storage for use while executing programs.

The mass storage device 1230 may comprise any type of storage device configured to store data, programs, and other information and to make the data, programs, and other information accessible via the bus 1240. The mass storage device 1230 may comprise, for example, one or more of a solid state drive, hard disk drive, a magnetic disk drive, an optical disk drive, or the like.

The I/O interface 1260 may provide interfaces to couple external input and output devices to the processing unit 1201. The I/O interface 1260 may include a video adapter. Examples of input and output devices may include a display coupled to the video adapter and a mouse/keyboard/printer coupled to the I/O interface. Other devices may be coupled to the processing unit 1201 and additional or fewer interface cards may be utilized. For example, a serial interface such as Universal Serial Bus (USB) (not shown) may be used to provide an interface for a printer.

The antenna circuit 1270 and antenna element 1275 may allow the processing unit 1201 to communicate with remote units via a network. In an embodiment, the antenna circuit 1270 and antenna element 1275 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 1270 and antenna element 1275 may also provide Bluetooth and/or WiFi connection to other devices.

The processing unit 1201 may also include one or more network interfaces 1250, which may comprise wired links, such as an Ethernet cable or the like, and/or wireless links to access nodes or different networks. The network interface 1201 allows the processing unit 1201 to communicate with remote units via the networks 1280. For example, the network interface 1250 may provide wireless communication via one or more transmitters/transmit antennas and one or more receivers/receive antennas. In an embodiment, the processing unit 1201 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A wireless device configured for transmitter receive band noise calibration, comprising:

a transmitter configured to transmit a signal according to at least one transmitter parameter;

a receiver configured to receive the signal;

a receive band noise calibration component configured to measure a receive band noise caused by the transmitted signal and determine a corrected transmitter parameter for the transmitted signal; and a transmit parameter controller configured to receive the corrected transmitter parameter from the receive band noise calibration component and adjust the transmitter parameter to correspond to the corrected transmitter parameter, wherein the transmitter is configured to retransmit a corrected signal according to the corrected transmitter parameter, wherein the receive band noise calibration component is configured to measure the receive band noise caused by the corrected transmitted signal and determine a new corrected transmitter parameter iteratively, until the new corrected transmitter parameter corresponds to a specified reduced receive band noise, wherein the receive band noise calibration component is configured to cause the transmit parameter controller to set the new corrected transmitter parameter as the transmitter parameter for future transmissions once the specified reduced receive band noise is achieved, and wherein the corrected transmitter parameter comprises a two phase delay adjustment, wherein the transmit parameter controller comprises a two phase delay adjustment component, and wherein the two phase delay adjustment component is coupled to a dual phase pulse width modulation (PWM) generation component.

2. The wireless device of claim 1, wherein the specified reduced receive band noise comprises a substantially minimum receive band noise.

3. The wireless device of claim 1, wherein the corrected transmitter parameter comprises at least one of an envelope correction and an IQ correction and the transmit parameter controller comprises at least one of an IQ adjustment component and an envelope adjustment component.

4. The wireless device of claim 1, wherein the corrected transmitter parameter comprises at least one of a $3^{rd}$ order counter-inter-modulation (CIM3) adjustment and an envelope correction, wherein the transmit parameter controller comprises at least one of a CIM3 adjustment component and an envelope adjustment component, wherein the envelope adjustment component is coupled to an envelope generation component, and wherein the CIM3 adjustment component is coupled to a transmit signal generation component.

5. The wireless device of claim 1, wherein the corrected transmitter parameter comprises a tunable capacitor value for an inductive capacitive circuit between an envelope tracking modulator and a power amplifier in a transmitter in the wireless device, wherein the inductive capacitive circuit comprises a tunable capacitor.

6. The wireless device of claim 1, wherein the specified reduced receive band noise comprises a reduction of the receive band noise below a specified threshold.

7. The wireless device of claim 1, wherein the specified reduced receive band noise comprises a reduction of the receive band noise by a specified percentage of an original receive band noise.

8. The wireless device of claim 1, wherein the transmitter and the receiver comprise a duplexer.

9. A method in a wireless device for transmitter receive band noise calibration, comprising:

transmitting a signal according to at least one transmitter parameter;

receiving the signal;

measuring a receive band noise caused by the transmitted signal;

determining a corrected transmitter parameter for the transmitted signal;

adjusting the transmitter parameter to correspond to the corrected transmitter parameter;

retransmitting a corrected signal according to the corrected transmitter parameter, iteratively measuring the receive band noise caused by the corrected transmitted signal and determining a new corrected transmitter parameter until the new corrected transmitter parameter corresponds to a specified reduced receive band noise; and setting the new corrected transmitter parameter as the transmitter parameter for future transmissions once the specified reduced receive band noise is achieved, wherein the corrected transmitter parameter comprises a two phase delay adjustment, wherein the transmit parameter is adjusted according to a transmit parameter controller, the transmit parameter controller comprising a two phase delay adjustment component, and wherein the two phase delay adjustment component is coupled to a dual phase pulse width modulation (PWM) generation component.

10. The method of claim 9, wherein the specified reduced receive band noise comprises a substantially minimum receive band noise.

11. The method of claim 9, wherein the corrected transmitter parameter comprises at least one of an envelope correction and an IQ correction and the transmit parameter controller comprises at least one of an IQ adjustment component and an envelope adjustment component.

12. The method of claim 9, wherein the corrected transmitter parameter comprises at least one of a $3^{rd}$ order counter-inter-modulation (CIM3) adjustment and an envelope correction, wherein the transmit parameter controller comprises at least one of a CIM3 adjustment component and an envelope adjustment component, wherein the envelope adjustment component is coupled to an envelope generation component, and wherein the CIM3 adjustment component is coupled to a transmit signal generation component.

13. The method of claim 9, wherein the corrected transmitter parameter comprises a tunable capacitor value for an inductive capacitive circuit between an envelope tracking modulator and a power amplifier in a transmitter in the wireless device, wherein the inductive capacitive circuit comprises a tunable capacitor.

14. The method of claim 9, wherein the specified reduced receive band noise comprises a reduction of the receive band noise below a specified threshold.

15. The method of claim 9, wherein the specified reduced receive band noise comprises a reduction of the receive band noise by a specified percentage of an original receive band noise.

16. The method of claim 9, wherein the transmitter and the receiver comprise a duplexer.

* * * * *